April 6, 1954     W. A. CAMPBELL     2,674,291
SAFETY TUBE
Filed Sept. 27, 1948
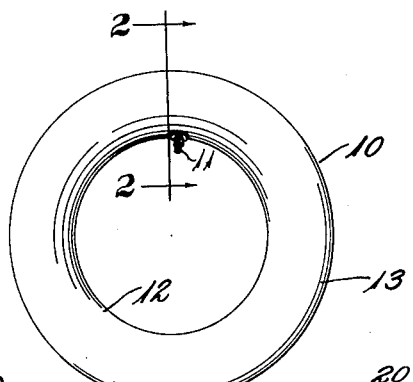
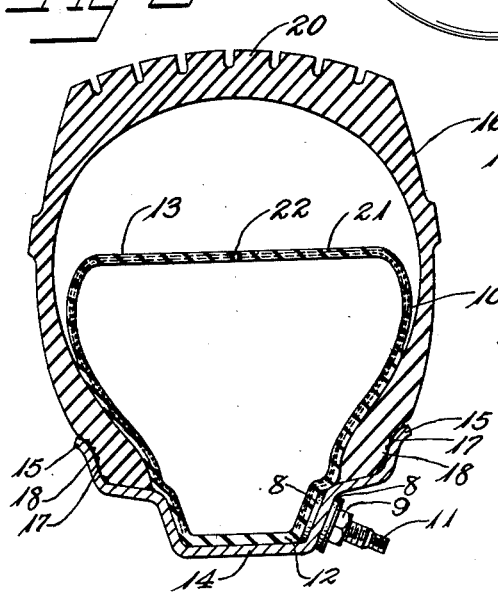
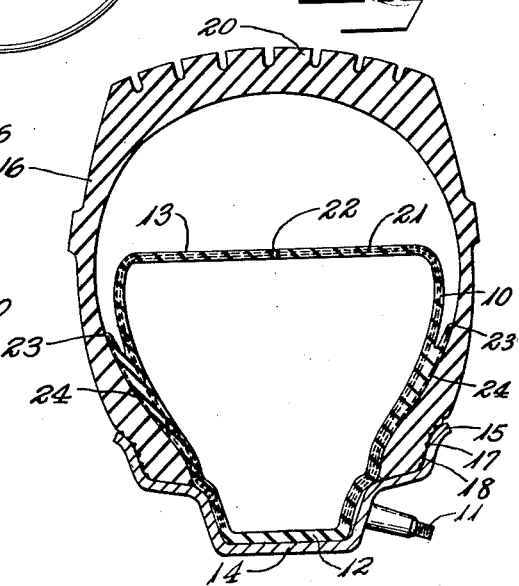
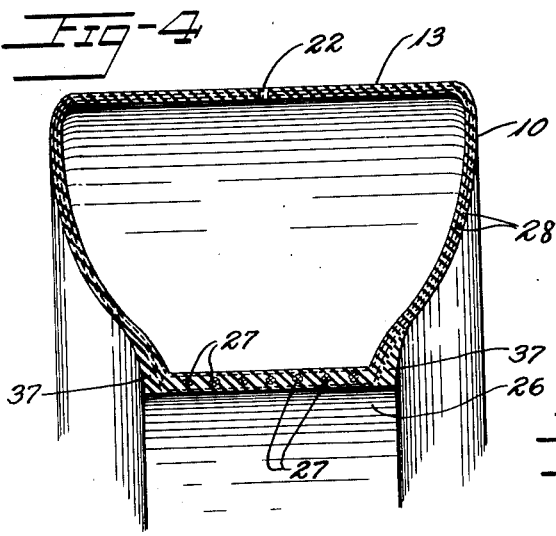
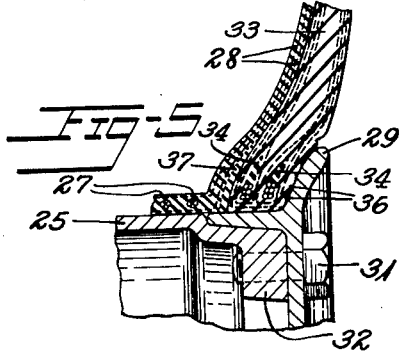
INVENTOR
William A. Campbell
By
Atty.

Patented Apr. 6, 1954

2,674,291

UNITED STATES PATENT OFFICE 2,674,291

SAFETY TUBE

William A. Campbell, Wadsworth, Ohio, assignor to The B. F. Goodrich Company, New York, N. Y., a corporation of New York Application September 27, 1948, Serial No. 51,327

12 Claims. (Cl. 152—341)

This invention relates to safety tubes and is especially useful in safety tubes for tires constructed to retain air without the use of an inner tube. A tire of that type is described in the patent application of Frank Herzegh, Serial No. 716,276, filed December 13, 1946, now Patent Number 2,587,470.

Tires which are dependent upon ordinary inner tubes for retaining air have been found to be not as desirable as tires which are constructed to hold the air without an inner tube as the tires without tubes run cooler and have higher resistance against bruising. Because of these features, the tires without tubes are less likely to have blowouts and are less likely to fail suddenly. However, there is a possibility that any tire may be damaged to such an extent that it may fail and deflate suddenly at high speed and cause the vehicle on which it is mounted to be thrown out of control. It might be expected that an inner tube could be so constructed as not to fill the tire casing and thereby somewhat avoid damage to the tube due to its location remote from the tread portion of the casing. However, upon rotation of a tire having a tube which does not fill the casing, the tube tends to move radially outward and a problem arises when there is such movement of the tube in the casing at high speeds causing vibration and unbalanced operation of the wheels.

To eliminate the foregoing and other difficulties, applicant provides a safety tube which does not fill that part of the carcass subject to the greatest flexing and most vulnerable to blow-outs or cutting while nevertheless retaining its position within the casing and therefore provides safety without increasing resistance to flexing of the tire, thereby reducing undesirable heating. The tube of this invention is disposed within the tire carcass adjacent the bead portion thereof and does not break when the tire carcass is punctured or broken. After a puncture or blow-out, an amount of air remains in the tube to support the tire and to retain it on the wheel. In the construction of this invention, the safety tube is held against the rim at the inner circumference but need not be attached to the tire thereby providing ready access to the inside of the tire carcass for repair of the carcass.

It has been found, by using the safety tube of the invention, that the vehicle is cushioned by the safety tube upon rupture of the tire and will be slowly lowered to the ground avoiding sudden collapse of the tire and loss of control of the vehicle by the operator.

Objects of this invention are to provide a safety tube having improved performance in retaining the supporting fluid within tires, especially within tires of the type which do not require inner tubes, to provide improved means for supporting the tire after rupture of the tire casing, to provide means for simultaneous inflation of the tire and tube, to provide for reducing the rate of deflation of the tube after failure of the tire casing, to provide for maintaining the safety tube in a position closely adjacent the rim thereby attaining stability of the tube at high speeds, to provide for preventing the passage of fluid between the wheel rim and the safety tube, and to provide simplicity in construction and ease of installation and repair.

These and other objects will be apparent from the following description, reference being had to the drawings in which:

Fig. 1 is an elevation of a tube constructed in accordance with and embodying the invention.

Fig. 2 is a section on a larger scale of the tube in the inflated condition taken along line 2—2 of Fig. 1 showing the relative position of the tire and rim.

Fig. 3 is a sectional view like Fig. 2 of a modified construction, the relative position of the tire and rim being shown.

Fig. 4 is a sectional view of another modification showing the tube before mounting on a rim.

Fig. 5 is a sectional view of a tube and a tire shown in Fig. 4 after being mounted on a rim, parts being broken away.

Referring to the drawing, a tube 10 of resilient rubber or other rubber-like material having an annular shape is shown in Fig. 1. Means for inflating the tube 10 such as a valve 11 is provided and may comprise a metal stem containing a one-way valve mounted in sealing engagement on a wall of the tube. Since the spaces both inside and outside the tube are inflated, differential pressure alone cannot generally be relied upon for holding the valve stem 11 in position and sealing against escape of air between the valve and the rim. Consequently, it is preferred to provide sealing washers 8, 8 of rubber or the like and to clamp the valve in position as by nut 9.

The tube 10 has an inner rim-engaging portion 12 and an outer portion 13. The inner portion 12 has a diameter substantially the same or less than the diameter of a supporting rim 14 shown in Fig. 2. The elastic properties of the resilient rubber or other rubber-like material of the tube 10 permit the inner portion 12 to have substantially the same diameter as the rim and to be used on drop-center type rims such as the rim 14 because the inner portion 12 may be stretched over flanges 15, 15. The elasticity of the inner portion 12 holds it snugly to the rim surface and prevents buckling or wrinkling at the rim surface which might adversely affect the stability of the tire. A tire casing 16 shown in Fig. 2 is mounted on the rim 14 and has sealing means such as grooves 17, 17 between beads 18, 18 of the tire casing and the rim flanges 15, 15 forming a fluid-retaining tire casing and rim assembly in which the tube 10 may be mounted.

The outer portion 13 of the tube 10 when inflated has a circumference greater than the circumference of the rim flanges 15, 15 but less than the circumference of the tire casing 16 and therefore does not interfere with flexing of the thread portion of the tire casing. For most effective operation, it has been found that the tube 10 when inflated should encompass at least 30% of the air space within the tire casing 16 and the rim 14. Upon rupture of the tire casing 16, the air retained in the tube provides sufficient support of the tire casing to prevent loss of steering control by the operator even at high speeds and prevents rim flanges 15, 15 from rolling on the tire casing and damaging the walls.

The outer portion 13 of the tube is preferably reinforced with plies 21, 21 of reinforcing material such as fabric which are embedded in the tube material and extend from one edge of the inner portion 12 circumferentially through the outer portion 13 to the other edge of the inner portion. The reinforcing plies 21, 21 limit the outward stretching of the tube 10 to insure that the tube does not contact the tire casing at positions on the face opposite from the ground-contacting surface such as tread 20. Since the tube 10 does not contact the tire casing 16, objects which penetrate the tire tread 20 will not simultaneously penetrate the tube even though they contact the outer portion 13 of the tube 10 as the outer portion is floating in the tire and may move away from such objects. Furthermore, the outer portion 13 is reinforced which prevents penetration at such small pressures.

A small aperture 22 is preferably located in the outer portion 13 of the tube 10. When the tube 10 is inflated by injecting air through the valve 11 the air is forced through the aperture 22 into the space outward of the tube 11 and inward of the tire casing and rim assembly. Upon rupture of the tire casing, air in the tube will be slowly released from the tube through the aperture 22. The aperture size may be substantially the same as the valve orifice to inflate the tire casing at the same rate as the tube is inflated but is preferably smaller than the valve orifice to provide a slow rate of escape for air in the tube upon rupture of the tire casing.

In operation, the tube 10 is mounted on the rim 14 by stretching the inner portion 12 over the rim flanges 15, 15 and the inner portion is urged against the rim 14 by the resilient action of the material of the tube. The tire casing 16 is mounted on the rim 14 with the beads 18, 18 in engagement with the rim at the sealing grooves 17, 17 of the tire casing. A fluid such as air is injected into the tube 10 through the valve 11 and urges the inner portion 12 against the rim 14 and the side surfaces of the tube against the side of the tire casing. As the tube 10 is inflated, the air passes through the aperture 22 and inflates the tire casing. When the tire rotates, the tube 10 tends to be urged outward. However, because the inner circumference of the tube is substantially the same as the circumference of the rim, the inner portion 12 of the tube is held on the rim so that it will not be displaced by centrifugal force and cause vibration because of unbalance of the tire.

When the tire casing is ruptured and air escapes rapidly from the tire through the opening caused by the rupture, the tube 10 retains a sufficient amount of air to support the tire casing so that the speed of the vehicle may be decreased without loss of control and without damaging the tire casing. Although the tube does lose air through the aperture 22, the rate of escape is slow, providing a good margin of safety. If repairs of the tire casing 16 are necessary, the tube 10 and tire casing may be easily separated for access to the inside of the casing.

In the modified form of the invention shown in Fig. 3, the tube 10 has circumferentially extending flanges or projections 23, 23 at the sides of the outer portion 13 and each projection extends outward from and along the side of the tube for engaging a side face of the tire casing 16 in continuous sealing contact therewith. Reinforcing plies of material such as fabric 24, 24 may be embedded in the projections 23, 23 and may extend into the walls of the tube 10. With this modified construction, the inner circumference of the tube 10 may initially be greater than the inner diameter of the rim 14, for ease in mounting, so that inflation of the tube will distend the tube to conform to the rim. However, it is preferable that the inner circumference of the tube be smaller than the circumference of the rim flanges 15. The flanges or projections 23, 23 prevent the flow of air between the rim 14 and tube 10 and therefore the air pressure in the inflated tire casing 16 and tube 10, even though greatly reduced, as by a blowout or puncture, is sufficient to move the inner portion 12 of the tube against the rim and hold it there. In this case, the air is sealed by projections 23, 23 and it is not essential that the valve 11 be sealed against rim 14.

In operation, the tube 10 is mounted on the rim 14 in the same manner as the tube of the form shown in Fig. 1 and described above. When the tube 10 and tire casing 16 are inflated, the air in the space outward of the tube and within the tire casing tends to urge the sealing flanges or projections 23, 23 against the wall of the tire casing. This is advantageous because at high speeds when the tube 10 would ordinarily be urged outward by centrifugal force the air pressure against the sealing flanges or projections 23, 23 holds the flanges against the wall of the tire casing 16 in sealing engagement therewith and prevents movement of the tube 10 which might cause vibration and unbalance of the tire.

Referring to Figs. 4 and 5, another modification is shown which is especially adaptable for use on a flat faced rim 25 having a detachable flange 29. The tube 10 has the outer portion 13 with the aperture 22 and an inner rim engaging portion 26 which incorporates the valve 11 or other suitable means for inflation and deflation with a fluid such as air as in the forms of the invention previously described.

The inner portion 26 of the tube 10 has a circumference which is substantially the same as the circumference of the rim 25. Reinforcing members such as wires 27, 27 are embedded in and extend circumferentially of the inner portion 26 for maintaining substantially the same circumference. Reinforcing material such as fabric 28 is embedded in the inner portion 26 extending into the outer portion 13, and may extend transversely completely around the tube to limit the outward movement of the tube and to prevent the outer portion from contacting the face of the tire casing opposite the tread in the inflated condition of the casing.

As shown in Fig. 5 the rim 25 has a detachable flange 29 secured to the rim by studs 31 threaded in a flange 32 integral with the rim. A tire casing 33 is mounted on the rim 25 and has beads 34, 34 which may have one or more bead rings of wire or other inextensible material. The flange-engaging portion of the beads 34, 34 may have sealing grooves 36, 36 for preventing the escape of air therebetween upon inflation of the tire casing.

The inner portion 26 of the tube has circumferential sealing strips 37, 37 of yieldable material at its margins for engaging the bead portions 34 of the tire casing. Such sealing strips may be of a compound containing rubber. The width of the inner portion 26 without the strips 37, 37 is preferably smaller than the distance between the beads 34, 34 of the tire casing when seated upon the rim, and the width of the inner portion 26 plus the strips is preferably greater than the distance between the beads. As shown in Fig. 5, upon mounting of the tube 10 upon the rim, the strips 37, 37 are compressed and distended between the tire 33 and tube 10 causing the plastic material to flow into the crevices and form a seal. The seal prevents air from within the casing leaking through the seam between the rim 25 and the detachable flange 29 and from entering the space between the inner portion 26 and rim 25 which might cause movement of the tube relative to the rim 25 upon high speed rotation of the wheels or permit leakage at the valve stem slot in the rim when no other seal is provided.

Variations may be made without departing from the scope of the invention as it is defined by the following claims.

I claim:

1. An independent annular tube of flexible material for unattached disposition in a fluid-retaining tire casing and rim assembly, said tube comprising a radially inner rim-engaging portion for closely engaging the rim, a radially outer inflatable portion disposed radially outward of the rim of smaller circumference than the internal circumference of the tire casing for encompassing a portion of the fluid contained in the tire casing and rim assembly and sustaining the tire upon rupture of the tire casing and providing an inflation space bounded by said radially outer portion and the inner face of the tire casing, means for inflating said tube, and a restricted aperture in said outer portion of the tube for controlled flow of fluid between the space enclosed by said tube and said inflation space outward of said tube and within the tire casing and rim assembly.

2. An independent annular tube of flexible material for unattached disposition in a fluid-retaining tire casing and rim assembly, said tube comprising a radially inner rim-engaging portion for closely engaging the rim, a radially outer inflatable portion having a smaller circumference than the circumference of the tire casing and of such capacity as to encompass at least 30% by volume of the fluid contained in the tire casing and rim assembly without contacting the tread portion of the tire for sustaining the tire upon rupture of the tire casing and said radially outer portion providing an inflation space bounded by said radially outer portion and the inner face of the tire casing, means for inflating said tube, and a restricted aperture in said outer portion of the tube for controlled flow of fluid between the space enclosed by said tube and said inflation space outward of said tube and within the tire casing and rim assembly.

3. An independent annular tube of flexible material for unattached disposition in an air-retaining tire casing and rim assembly, said tube comprising a radially inner rim-engaging portion for closely engaging the rim, an inflatable portion disposed radially outward of the rim of smaller circumference than the tire casing for encompassing a portion of the air contained in the tire casing and rim assembly for sustaining a tire upon rupture of the tire casing and providing an inflation space bounded by said inflatable portion and the inner face of the tire casing, said tube having reinforcing material embedded therein for limiting the outward expansion thereof, means for inflating said tube, and a restricted aperture in said outer portion for controlled flow of fluid between the space enclosed by said tube and said inflation space outward of said tube within the tire casing and rim assembly.

4. An independent annular tube of resilient rubber-like material for disposition in an air-retaining tire casing and rim assembly, said tube comprising a radially inner stretchable rim-engaging portion of a circumference not greater than that of the rim, a radially outer inflatable portion of smaller circumference than the tire casing for encompassing a portion of the air contained in the tire casing and rim assembly and sustaining the tire upon rupture of the tire casing and providing an inflation space bounded by said radially outer portion and the inner face of the tire casing, said outer portion having reinforcing material embedded therein for limiting the outward stretching thereof, means for inflating said tube, and a restricted aperture in said outer portion for controlled flow of air between the space enclosed by said tube and said inflation space outward of said tube and within the tire casing and rim assembly.

5. An independent annular tube of resilient rubber-like material for disposition in an air-retaining tire casing and rim assembly, said tube comprising a radially inner stretchable rim-engaging portion of a circumference less than that of the rim, a radially outer inflatable portion of smaller circumference than the tire casing for encompassing a portion of the air contained in the tire casing and rim assembly and sustaining the tire upon rupture of the tire casing and providing an inflation space bounded by said radially outer portion and the inner face of the tire casing, said outer portion having reinforcing material embedded therein for limiting the outward stretching thereof, means for inflating said tube, and a restricted aperture in said outer portion for controlled flow of air between the space enclosed by said tube and said inflation space outward of said tube and within the tire casing and rim assembly.

6. An independent annular tube of flexible material for disposition in a fluid-retaining tire casing and rim assembly, said tube comprising a radially inner rim-engaging portion, a radially outer inflatable portion having a smaller circumference than the circumference of the tire casing and of such capacity as to encompass at least 30% by volume of the fluid contained in the tire casing and rim assembly for sustaining the tire upon rupture of the tire casing and said radially outer portion providing an inflation space bounded by said radially outer portion and the inner face of the tire casing, said tube having a circumferential, outwardly extending flange at said outer portion for sealing engagement with the wall of the tire casing, means for inflating said tube, and a restricted aperture in said outer portion for controlled flow of fluid between said inflation space enclosed by said tube and the space outward of said tube and within the tire casing and rim assembly.

7. An independent annular tube of resilient rubber-like material for disposition in an air-retaining tire casing and rim assembly, said tube comprising a radially inner stretchable rim-engaging portion, a radially outer inflatable portion of smaller circumference than the circumference of the tire casing of such capacity as to encompass at least 30% by volume of the air contained in the tire casing and rim assembly for sustaining the tire upon rupture of the tire casing and said radially outer portion providing an inflation space bounded by said radially outer portion and the inner face of the tire casing, said tube having circumferentially outwardly extending sealing flanges at the sides of said outer portion for sealing engagement with opposing walls of the tire casing, reinforcing material embedded in said outer portion and extending into said flanges, means for inflating said tube, and a restricted aperture in said outer portion for controlled flow of air between the space enclosed by said tube and said inflation space outward of said tube and within the tire casing and rim assembly.

8. An independent annular tube of flexible material for disposition in an air-retaining tire casing and rim assembly, said tube comprising a radially inner rim-engaging portion substantially equal in circumference to the rim and containing circumferentially extending reinforcing members embedded therein for maintaining the circumference of said inner portion, a radially outer portion of smaller circumference than the tire casing of such capacity as to encompass a portion of the air contained in the tire casing and rim assembly for sustaining the tire upon rupture of the tire casing and providing an inflation space bounded by said radially outer portion and the inner face of the tire casing, said outer portion having reinforcing material embedded therein for limiting outward stretch thereof and preventing contact thereof with the tread portion of the tire, means for inflating said tube, and a restricted aperture in said outer portion for the controlled flow of air between the space enclosed by said tube and said inflation space outward of said tube and within the tire casing and rim assembly.

9. An annular tube of flexible material for disposition in an air-retaining tire casing and rim assembly, said tube comprising a radially inner rim-engaging portion for disposition between the beads of the tire and of substantially the same circumference as the rim, strips of yieldable plastic material extending circumferentially of the tube at margins of said inner portion, the sum of the widths of said inner portion and said strips being greater in the unmounted condition than the width of the space between the beads of the tire when mounted for holding said strips in sealing engagement with the tire casing upon mounting of the tire on said rim, a radially outer portion of said tube of smaller circumference than the interior of the tire casing for encompassing a portion of the air contained in the tire casing and rim assembly and sustaining the tire upon rupture of the tire casing, means for inflating said tube, and a restricted aperture in said outer portion for the controlled flow of air between the space enclosed by said tube and the space outward of said tube and within the tire casing and rim assembly.

10. In combination, a flanged rim, an inflatable impervious annular tire casing having beads engaging the flanges of the rim, and a tube consisting of a single independent hollow annulus of flexible material disposed within the tire casing, said tube comprising a radially inner stretchable rim-engaging portion of a circumference not greater than that of the rim, a radially outer inflatable portion of smaller circumference than the tire casing for encompassing a portion of the air contained in the tire casing and rim assembly and sustaining the tire upon rupture of the tire casing and providing an inflation space bounded by said radially outer portion and the inner face of the tire casing, said outer portion having reinforcing material embedded therein for limiting the outward stretching thereof and means for inflating the tube and said inflatable space within the tire outside the tube.

11. In combination, a flanged rim, an inflatable impervious annular tire casing having beads engaging the flanges of the rim, and a tube consisting of a single independent hollow annulus of flexible material disposed within and unattached to the tire casing, said tube comprising a radially inner rim-engaging portion for disposition between the beads of the tire and of substantially the same circumference as the rim, strips of yieldable plastic material extending circumferentially of the tube at the margins of said inner portion, the sum of the widths of said inner portion and said strips being greater in the unmounted condition than the width of the space between the beads of the tire when mounted for holding said strips in sealing engagement with the tire casing upon mounting of the tire on said rim, a radially outer portion of said tube of smaller circumference than the internal circumference of the tire casing for encompassing a portion of the air contained in the tire casing and sustaining the tire upon rupture of the tire casing and providing an inflation space bounded by said radially outer portion and the inner face of the tire casing and means for inflating the tube and said inflation space within the tire outside the tube.

12. In combination, a flanged rim, an inflatable impervious annular tire casing having beads engaging the flanges of the rim, and a tube consisting of a single independent hollow annulus of flexible material disposed within and unattached to the tire casing, said tube comprising a radially inner rim-engaging portion for closely engaging the rim, a radially outer inflatable portion disposed radially outward of the rim of smaller circumference than the internal circumference of the tire casing for encompassing a portion of the fluid contained in the tire casing and sustaining the tire upon rupture of the tire casing said radially outer portion providing an inflation space bounded by said radially outer portion and the inner face of the tire casing, means for inflating said tube, and a restricted aperture in said outer portion of the tube for controlled flow of fluid between the space enclosed by said tube and said inflation space outward of said tube and within the tire casing and rim assembly.

References Cited in the file of this patent

UNITED STATES PATENTS

| Number | Name | Date |
|---|---|---|
| 2,200,916 | Crowley | May 14, 1940 |
| 2,240,169 | Benson et al. | Apr. 29, 1941 |
| 2,241,593 | Gramelspacher | May 13, 1941 |
| 2,343,828 | Burkley | Mar. 7, 1944 |
| 2,554,815 | Church | May 29, 1951 |

FOREIGN PATENTS

| Number | Country | Date |
|---|---|---|
| 683,619 | France | Mar. 4, 1930 |